US011802489B1

(12) United States Patent
Spierling

(10) Patent No.: US 11,802,489 B1
(45) Date of Patent: Oct. 31, 2023

(54) ENERGY HARVESTING FOR HYBRID PROPULSION SYSTEMS

(71) Applicant: Hamilton Sundstrand Corporation, Charlotte, NC (US)

(72) Inventor: Todd A. Spierling, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/942,945

(22) Filed: Sep. 12, 2022

(51) Int. Cl.
*F01D 15/10* (2006.01)
*B64D 27/24* (2006.01)
*F02B 37/10* (2006.01)
*F02B 39/10* (2006.01)
*B64D 27/02* (2006.01)

(52) U.S. Cl.
CPC ............. *F01D 15/10* (2013.01); *B64D 27/24* (2013.01); *F02B 37/10* (2013.01); *F02B 39/10* (2013.01); *B64D 2027/026* (2013.01); *F05D 2220/76* (2013.01)

(58) Field of Classification Search
CPC ... F01D 15/10; B64D 27/24; B64D 2027/026; F02B 37/10; F02B 39/10; F05D 2220/76
See application file for complete search history.

(56) References Cited

U.S. PATENT DOCUMENTS

| 9,677,466 | B2 | 6/2017 | Smaoui et al. |
| 2016/0167799 | A1* | 6/2016 | Smaoui ............... B60K 6/24 701/16 |
| 2018/0202353 | A1* | 7/2018 | Favaretto ............ F02D 41/0007 |
| 2019/0316514 | A1* | 10/2019 | Haag ................... B60K 6/485 |
| 2020/0039657 | A1 | 2/2020 | Ransom et al. |
| 2020/0173354 | A1* | 6/2020 | Punjani ................. F01N 13/008 |

FOREIGN PATENT DOCUMENTS

CN 107696812 A 2/2018

* cited by examiner

*Primary Examiner* — Mickey H France
(74) *Attorney, Agent, or Firm* — Locke Lord LLP; Joshua L. Jones; Gabrielle L. Gelozin

(57) ABSTRACT

In accordance with at least one aspect of this disclosure, a system includes a turbine configured to fluidly connect to a heat engine to be driven by exhaust from the heat engine, the turbine including a turbine shaft, and a generator operatively coupled to the turbine shaft to be driven by the turbine configured to receive rotational input power from turbine shaft and to convert the rotational input power to output power to generate electrical energy.

9 Claims, 2 Drawing Sheets

ENERGY HARVESTING FOR HYBRID PROPULSION SYSTEMS

TECHNICAL FIELD

The present disclosure relates to parallel hybrid propulsion system, and more particularly to energy harvesting for the parallel hybrid propulsion system.

BACKGROUND

Typical hybrid electrified powertrains include a battery to provide energy for certain portions of the mission. The mission may include electrical augmentation for use in aborted landing or go-around scenarios, for example. Reserve energy can be accommodated by sizing a battery to allow for charging on the ground prior to flight, or a smaller battery can be depleted/recharged multiple times over the course of a flight. However, charging the battery using a motor/generator on the vehicle in a conventional hybrid arrangement consumes fuel (and generates CO2) since the engine shaft energy is needed to drive the motor/generator. This can result is increased fuel consumption due to either excess battery weight or need to carry excess fuel for charging of a battery There is always a need in the art for improvements to energy harvesting, e.g., in the context of hybrid powertrains, including in the aerospace industry. This disclosure provides a solution for this need.

SUMMARY

In accordance with at least one aspect of this disclosure, a system includes a turbine configured to fluidly connect to a heat engine to be driven by exhaust from the heat engine, the turbine including a turbine shaft, and a generator operatively coupled to the turbine shaft to be driven by the turbine configured to receive rotational input power from turbine shaft and to convert the rotational input power to output power to generate electrical energy.

In embodiments, the system can further include, the heat engine configured to drive a heat engine shaft, an electric motor configured to drive an electric motor shaft, and a transmission system including at least one gearbox, the transmission system configured to receive rotational input power from each of the heat engine shaft and the electric motor shaft and to convert the rotation input power to output power to generate thrust. In embodiments, the turbine is not mechanically connected to the transmission system.

In embodiments, the system can further include an electric energy storage unit (e.g., a battery) electrically connected to provide power to the electric motor. In certain embodiments, the electric energy storage unit can be electrically connected between the generator and the electric motor. In such embodiments, the generator can be configured to provide electrical energy to be stored in the electric energy storage unit to charge the electric energy storage unit. In certain embodiments, the electric motor does not contribute to charging the electric energy storage unit.

In embodiments, the turbine can be directly driven by the exhaust from the heat engine without any intervening mechanical, electrical, or pneumatic components between the heat engine and the turbine.

In certain embodiments, the system can include a compressor operatively coupled to the turbine shaft configured to provide compressed air to the heat engine for combustion. The generator can be operatively coupled to the turbine shaft between the compressor and the turbine in such embodiments. In certain embodiments, the compressor and turbine can form a turbocharger for turbocharging the heat engine.

In accordance with at least one aspect of this disclosure, an aircraft power system can include one or more auxiliary turbines configured to fluidly connect to an internal combustion engine to receive an exhaust flow from the internal combustion engine and convert energy of the exhaust flow into rotational power. A generator can be operatively connected to receive at least some of the rotational power from the turbine for generating electrical power, and at least one electric storage unit electrically can be connected to the generator to receive at least some of the electrical power to store the electrical power to be used by a hybrid propulsion system.

In embodiments, the aircraft power system can include the hybrid propulsion system including the internal combustion engine and an electric motor, the electric motor being electrically connected to draw power from the electric energy storage unit.

In embodiments, the turbine can include a turbine shaft, and in certain embodiments, a compressor for supplying combustion air to the internal combustion engine, the turbine shaft operatively connecting one of the one or more auxiliary turbines to the compressor to transfer at least some of the rotational power to the compressor.

In accordance with at least one aspect of this disclosure, a method can include directly driving a turbine with exhaust from an internal combustion engine, extracting electrical power from rotation of the turbine, storing the electrical power in an electric energy storage unit, and using the stored electrical power to drive an electric motor of a hybrid propulsion system to generate thrust. In embodiments, extracting electrical power includes extracting rotational power of the turbine with a turbocharger, wherein the turbine is a turbocharger turbine. In embodiments, the method can further include providing compressed air to the internal combustion engine with a compressor of the turbocharger.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
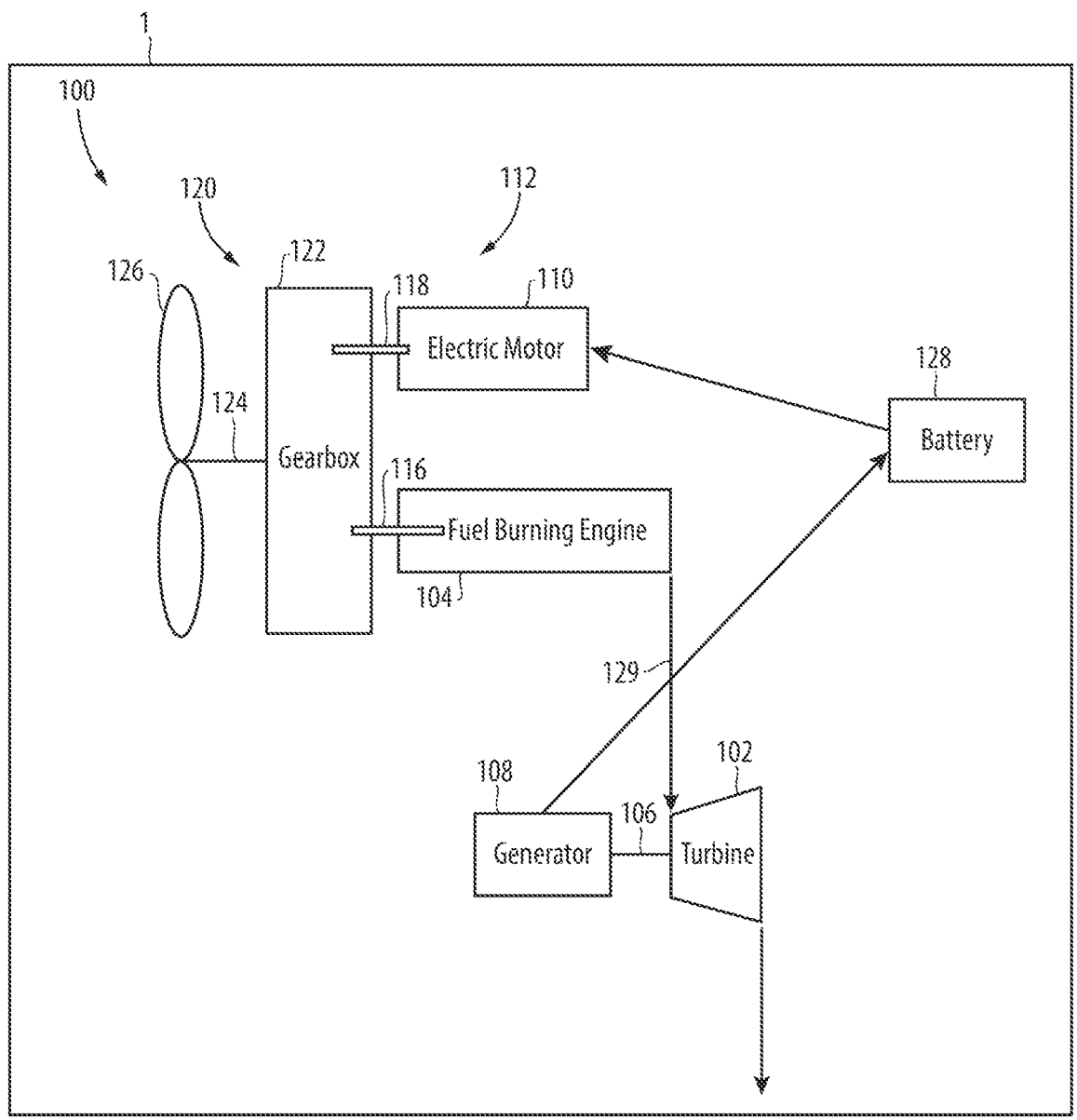
FIG. 1 is a schematic diagram of an embodiment of a system in accordance with this disclosure, showing an aircraft power system.
Figure 2:
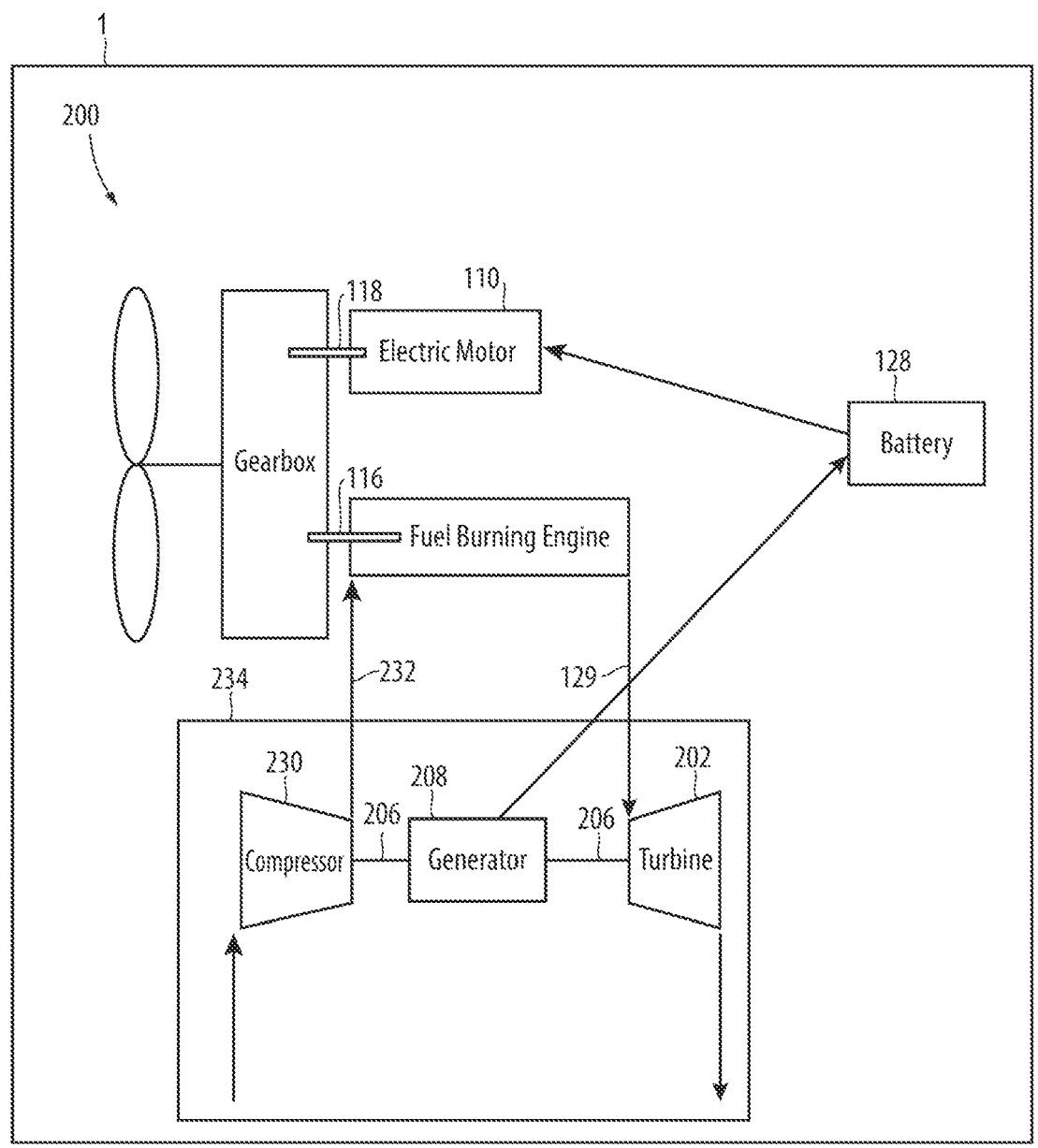
FIG. 2 is a schematic diagram of another embodiment of an aircraft power system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to harvest waste energy from a powerplant for charging a battery and/or powering an electric motor.

In accordance with at least one aspect of this disclosure, a system 100 (e.g., an aircraft power system) can include a turbine 102 configured to fluidly connect to a heat engine 104 to be driven by exhaust from the heat engine 104, the turbine 102 including a turbine shaft 106. A generator 108 can be operatively coupled to the turbine shaft 106 to be driven by the turbine 102 and configured to receive rotational input power from turbine shaft 106 and to convert the rotational input power to output power to generate electrical energy. In embodiments, the electrical energy can be used to power an electric motor 110 (e.g., of a hybrid-electric powerplant 112 of an aircraft 1).

The system can further include, the heat engine 104 configured to drive a heat engine shaft 116, the electric motor 110 configured to drive an electric motor shaft 118, and a transmission system 120 including at least one gearbox 122. The transmission system 120 can be configured to receive rotational input power from each of the heat engine shaft 116 and the electric motor shaft 118 and to convert the rotation input power to output power to generate thrust. The heat engine 104, the electric motor 110, and the transmission system 120 can together form at least part of the hybrid-electric powerplant 112.

It is envisioned that the heat engine 104 of the hybrid-electric powerplant 112 could be a heat engine of any type, e.g., a gas turbine, spark ignited, diesel, rotary or reciprocating engine of any fuel type and with any configuration of turbomachinery elements, either turbocharger, turbosupercharger, supercharger and exhaust recovery turbo compounding, either mechanically, electrically, hydraulically or pneumatically driven.

The at least one gearbox 122 can include a combining gearbox connecting to the heat engine shaft 116 and to the electric motor shaft 118 to combine rotational input power from the heat engine 104 and electric motor 110 for providing rotational output power to an output shaft (e.g., an engine shaft 124). The engine shaft 124 can be further connected to a second gearbox, or else to an air mover 126 (e.g., a fan or propeller) to generate thrust and propel the aircraft 1. Any suitable number of additional gearboxes can be included in the hybrid-electric propulsion system to drive any suitable number of air movers.

In embodiments, the system 100 can further include an electric energy storage unit 128 (e.g., a battery) electrically connected to provide power to the electric motor 110. In certain embodiments, the electric energy storage unit 128 can be electrically connected between the generator 108 and the electric motor 110. In such embodiments, the generator 108 can be configured to provide electrical energy to be stored in the electric energy storage unit 128 to charge the electric energy storage unit 128. In certain embodiments, the electric motor 110 does not contribute to charging the electric energy storage unit 128. The electric motor 110 instead is configured only to draw power from the electric energy storage unit 128.

In embodiments, the turbine 102 can be directly driven by the exhaust 129 from the heat engine 104. For example, there is no intervening mechanical, electrical, or pneumatic components between the heat engine 104 and the turbine 102. Further, in embodiments the turbine 102 is not mechanically connected to any of the heat engine 104, the electric motor 110, the transmission system 120, or the engine shaft 124, and therefore is not driven mechanically by any portion of the hybrid-electric powerplant 112. The system 100 as described herein utilizes strictly waste exhaust from the heat engine 104 to generate electricity through the generator 108, rather than using "free" energy from rotation of the engine shaft 124 during normal operation or windmilling, for example.

In certain embodiments, a system 200 can have similar components as in system 100. For brevity, the description of common elements that have been described above are not repeated with respect to FIG. 2. The system 200 can include a compressor 230 operatively coupled to the turbine shaft 206 configured to provide compressed air 232 to the heat engine 104 for combustion. Here, the generator 208 can be operatively coupled to the turbine shaft 206 between the compressor 230 and the turbine 202. In this case, the compressor 230 and turbine 202 can form a turbocharger 234 for turbocharging the heat engine 104.

In accordance with at least one aspect of this disclosure, a method can include directly driving a turbine (e.g., turbine 102, 202) with exhaust from an internal combustion engine (e.g., heat engine 104), extracting electrical power from rotation of the turbine, storing the electrical power in an electric energy storage unit (e.g., unit 128), and using the stored electrical power to drive an electric motor (e.g., motor 110) of a hybrid propulsion system (e.g., powerplant 112) to generate thrust. In embodiments, extracting electrical power includes extracting rotational power of the turbine with a turbocharger (e.g., turbocharger 234), wherein the turbine is a turbocharger turbine. In embodiments, the method can further include providing compressed air to the internal combustion engine with a compressor (e.g., compressor 230) of the turbocharger.

Fuel burning engines generate waste heat due to engine cycle inefficiency. Certain internal combustion engines (e.g., reciprocating, rotary, and the like) often include a turbocharger to provide additional horsepower and/or altitude capability. Embodiments incorporate a generator that utilizes this exhaust energy (e.g., through a turbine either alone or as a part of the turbocharger unit) that can allow this otherwise wasted energy to be used for battery recharging, allowing incorporation of a smaller battery without engine fuel usage penalty. Embodiments allow for reduced aircraft weight due to smaller battery size for reduced fuel burn and carbon emissions. Embodiments also allow for increased aircraft safety due to ability to ability to recharge battery in flight without incurring aircraft range reduction.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
 a turbine configured to fluidly connect to a heat engine to be driven by exhaust in an exhaust path from the heat engine, the turbine including a turbine shaft; and
 a generator operatively coupled to the turbine shaft to be driven by the turbine configured to receive rotational input power from turbine shaft and to convert the rotational input power to output power to generate electrical energy, wherein the turbine is directly driven by the exhaust from the heat engine without any intervening mechanical, electrical, or pneumatic components between the heat engine and the turbine in the exhaust path, wherein there is no compressor connected to be driven by the turbine shaft.

2. The system of claim 1, further comprising:
 the heat engine configured to drive a heat engine shaft;
 an electric motor configured to drive an electric motor shaft; and
 a transmission system including at least one gearbox, wherein the transmission system is configured to receive rotational input power from each of the heat engine shaft and the electric motor shaft and to convert the rotation input power to output power to generate thrust.

3. The system of claim 2, further comprising an electric energy storage unit electrically connected to provide power to the electric motor.

4. The system of claim 3, wherein the electric energy storage unit is electrically connected between the generator and the electric motor.

5. The system of claim 4, wherein the generator is configured to provide electrical energy to be stored in the electric energy storage unit to charge the electric energy storage unit.

6. The system of claim 5, wherein the electric motor does not contribute to charging the electric energy storage unit.

7. The system of claim 2, wherein the turbine is not mechanically connected to the transmission system.

8. The system of claim 1, wherein the electric energy storage unit includes a battery.

9. A method comprising:
 directly driving a turbine with exhaust from an internal combustion engine, wherein there is no compressor connected to be driven by the turbine;
 extracting electrical power from rotation of the turbine;
 storing the electrical power in an electric energy storage unit; and
 using the stored electrical power to drive an electric motor of a hybrid propulsion system to generate thrust.

* * * * *